May 12, 1964

P. L. MAY ETAL 3,132,736

BALE THROWER

Filed March 27, 1961

INVENTORS.
Patrick L. May and
John R. Majkrzak

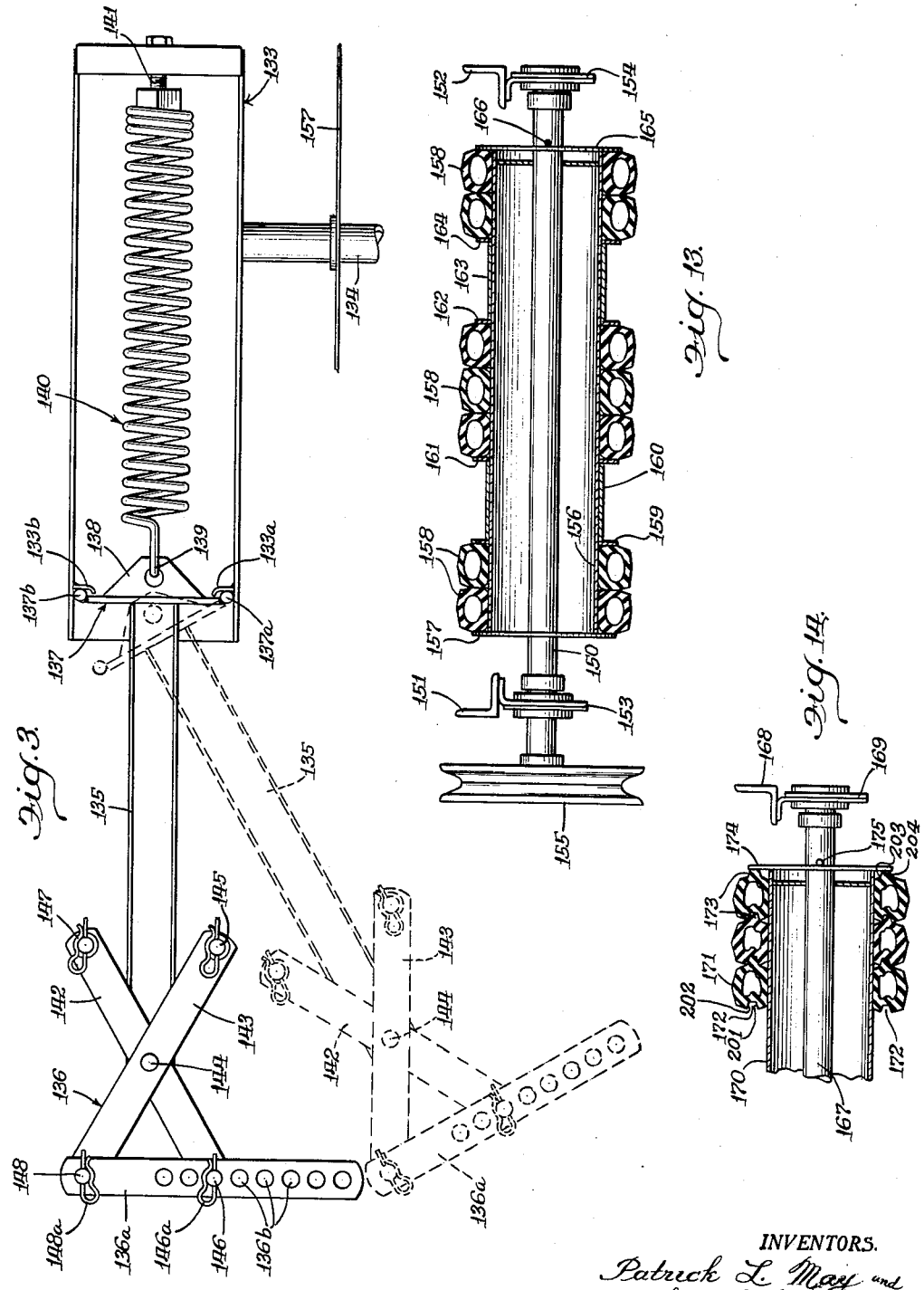

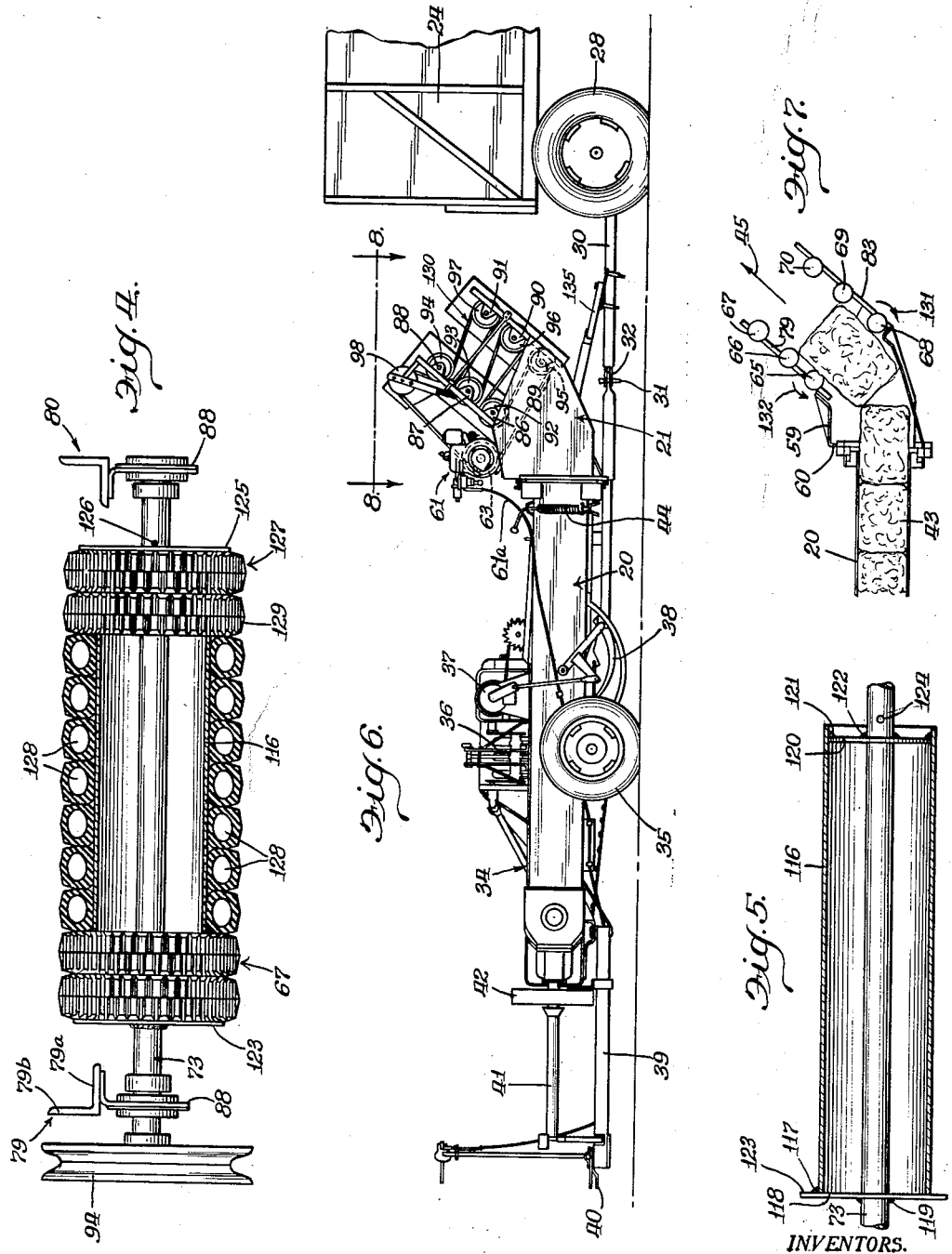

May 12, 1964  P. L. MAY ETAL  3,132,736
BALE THROWER
Filed March 27, 1961  5 Sheets-Sheet 4
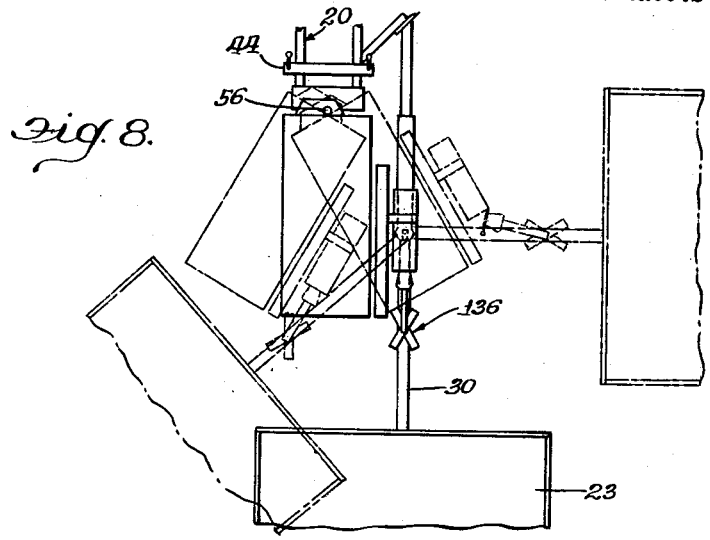
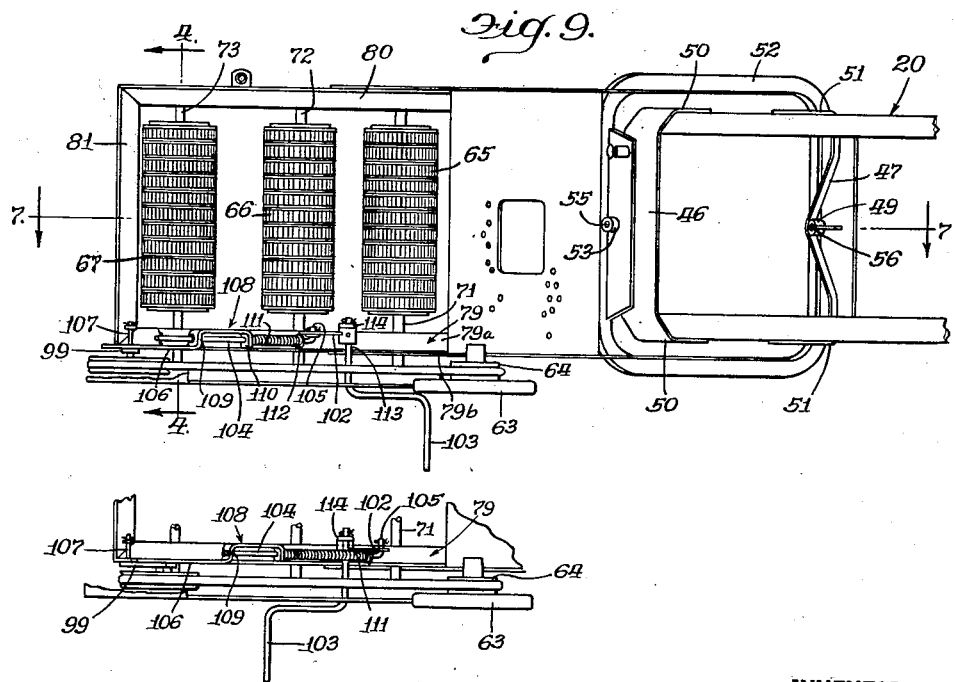
INVENTORS.
Patrick L. May and
John R. Majkrzak
Atty.

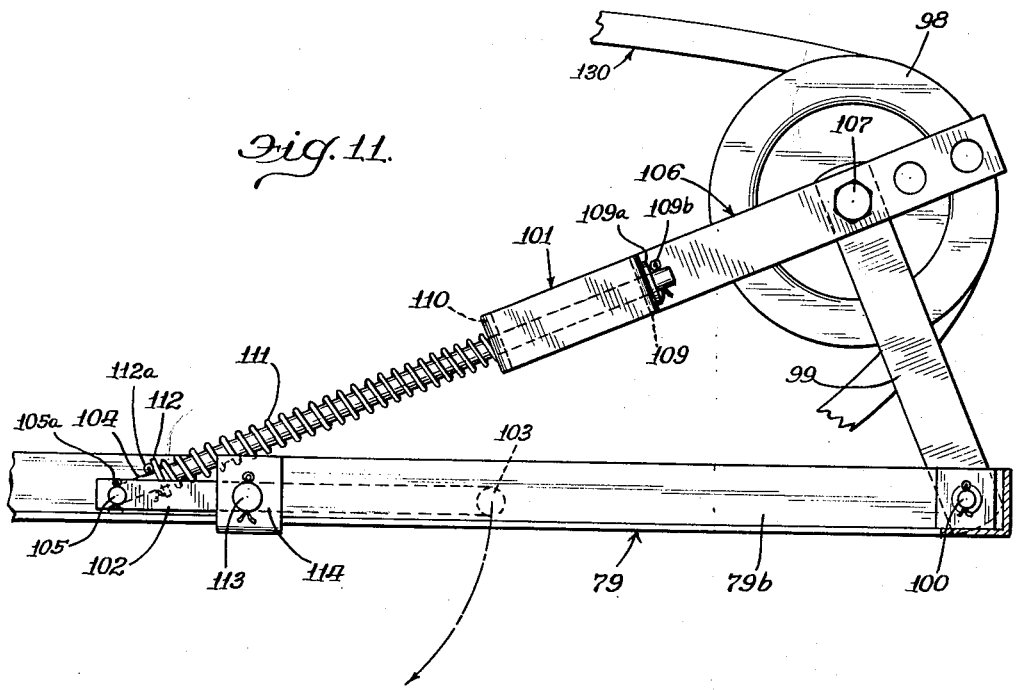
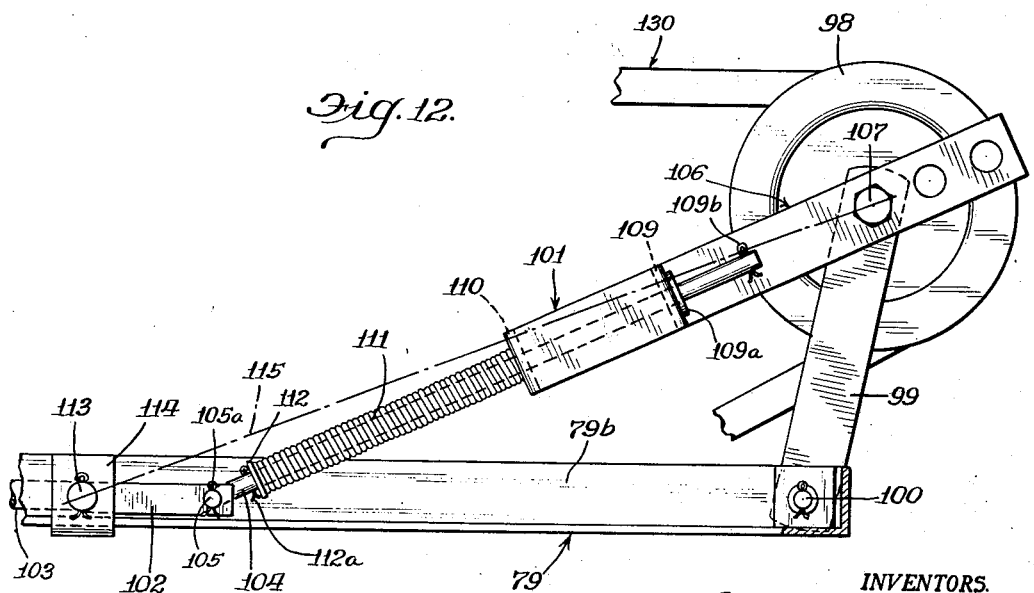

United States Patent Office 3,132,736
Patented May 12, 1964

3,132,736
BALE THROWER
Patrick L. May and John R. Majkrzak, Memphis, Tenn., assignors to International Harvester Company, Chicago, Ill., a corporation of New Jersey
Filed Mar. 27, 1961, Ser. No. 98,538
1 Claim. (Cl. 198—127)

This invention relates to a new and improved bale thrower.

The need for transporting a completed bale of hay to a temporary depositary such as a trailing wagon has long existed. Many conveyors have been employed intermediate a field traversing hay baler and its trailing wagon to deliver completed bales from the bale former to the trailing wagon. Some of these conveyors have required substantial structure to effect this transportation of bales while others, such as the device shown in a copending application of one of the joint inventors of this application, Serial No. 69,883, entitled Bale Discharge Device for Balers, eliminates substantial structure and yet performs the desired function of delivering a completed bale to a trailing wagon.

It is a principal object of the present invention to provide a bale thrower for attachment to hay balers whereby completed bales of hay may be thrown from the baler to a trailing wagon.

An important object of this invention is the provision of a bale thrower utilizing bale engaging rollers consisting of a series of semi-pneumatic tires.

Another important object of this invention is to supply a bale throwing roller which is economical to construct, lighter in weight and yet has greater gripping or traction with the surface of a bale of hay when gripping that bale and impelling it to a depositary.

A still further important object of this invention is to provide for a construction of a friction roller adapted to engage and throw a bale of hay on which annular portions of said roller are recessed from the bale engaging surfaces to avoid having the roller contact the bale encircling twine.

Another and still further important object of this invention is the provision of a construction for friction feeding rolls in which the rolls comprise a plurality of side-by-side semi-pneumatic tires having interlocking means formed integrally therewith whereby when two rolls are closely nested one with the other the tires will be constrained to all extend radially the same distance.

Other and further important objects and advantages will become apparent from the disclosures in the following specification and accompanying drawings.

In the drawings:

FIG. 3 is a bottom view of the steering arm arrangement employed in this device. FIG. 3 is further identified as a view taken on the line 3—3 of FIG. 2.

FIG. 4 is a front elevational view of one of the rollers of this invention and having the central portion thereof cut to show a sectional view of the interior thereof. The sectional portion of this figure may be considered to be taken on the line 4—4 of FIG. 9.

FIG. 5 is a sectional view of the core of the roller shown in FIG. 4.

FIG. 6 is a side elevational view of the entire baler, thrower and trailing wagon combination.

FIG. 7 is a cross-sectional view taken on the line 7—7 of FIG. 9 or through the thrower to illustrate the movement of the bale in between the thrower rolls.

FIG. 8 is a top plan view of the rear of a baler with the thrower of this invention mounted thereon. The view of FIG. 8 may be considered to be taken on the line 8—8 of FIG. 6.

FIG. 9 is a plan view of the inclined top portion of the bale thrower as taken on the line 9—9 of FIG. 2.

FIG. 10 is a plan view detail of a portion of the device of FIG. 9 showing the idler control arm in the loose position.

FIG. 11 is a detail of a side elevational view partially in section of the belt tightener of this invention shown in belt loosened position.

FIG. 12 is a detail similar to FIG. 11 with the device shown in belt tightened position.

FIG. 13 is a modified view of the roll construction of this invention.

FIG. 14 is a still further modified view of the roll construction of this invention.

Figure 1:
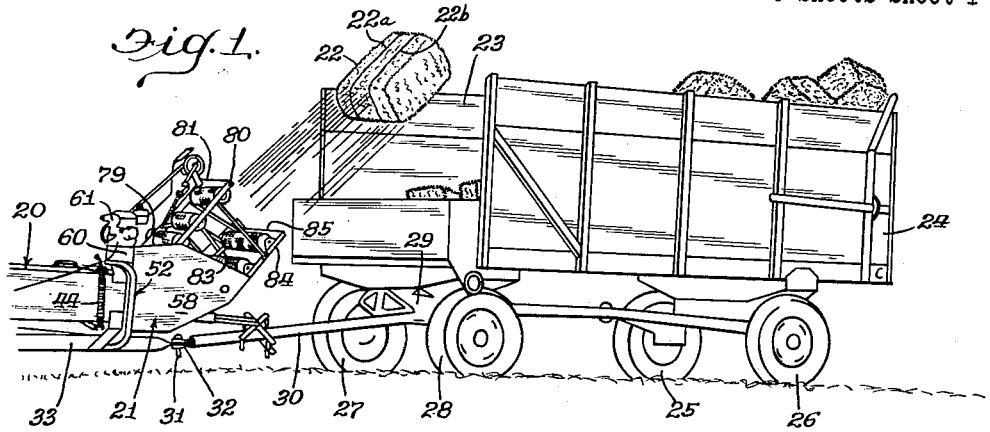
FIG. 1 is a perspective view showing the rear of a baler with the thrower of this invention mounted thereon and depicting the throwing of a bale into a trailing wagon in which the bales are being deposited at random.

As shown in the drawings, the reference numeral 20 indicates generally a bale forming chamber terminating in aligned engagement with a bale thrower 21 of this invention. The device as shown in FIG. 1 depicts a formed bale 22 being thrown upwardly and rearwardly toward the open top 23 of a wagon box 24 constituting a trailing wagon. The wagon box 24 is carried on rear wheels 25 and 26 and on forwardly disposed angularly positionable wheels 27 and 28 which are joined by a cross member 29 having a forwardly disposed swingable tongue 30. The tongue is joined by means of a pin 31 and intermediate clevis 32 to a rearwardly projecting hitch 33 on the baler.

Attention is now directed to FIG. 6 of the drawings wherein the entire hay baler designated by the numeral 34 is shown. The baler includes a wheel support 35, a longitudinally extending bale forming chamber 20, packer fingers 36 to feed hay to be baled to the forming chamber, and knotter mechanisms 37 having cooperating therewith strand-carrying and bale-encircling needles 38. The forward end of the baler 34 is equipped with a forwardly projecting tongue or the like 39 which has a clevis 40 on the forward end thereof to provide for attachment of the baler to a pulling tractor. The baler as shown in this drawing is of the power take-off type and utilizes rotational drive from the pulling tractor to deliver rotation through the tube 41 and thence to a large inertia flywheel 42. The flywheel, in turn, imparts reciprocal drive to a plunger (not shown) which operates within the longitudinally extending bale forming chamber in a manner to compress hay into bale formation such as shown at 43 in FIG. 7. A bale chamber tensioning means 44 is provided adjacent the rear discharge end of the forming chamber 20 just prior to admission of the formed bales 43 to the bale thrower of this invention. The thrower designated generally by the numeral 21 is arranged and constructed to receive the formed bales 43 as they are made by the baler 34 and impel them upwardly and rearwardly as shown by the arrow 45 into the trailing wagon 24.

The bale thrower 21 is similar to the thrower shown in the copending application, Serial No. 69,883, of Patrick L. May, one of the joint inventors of this invention. The previous application includes a plurality of rollers which are driven at relatively high speeds to frictionally engage the bale and cause it to be thrown upwardly and rearwardly for deposit into a trailing wagon.

Figure 2:
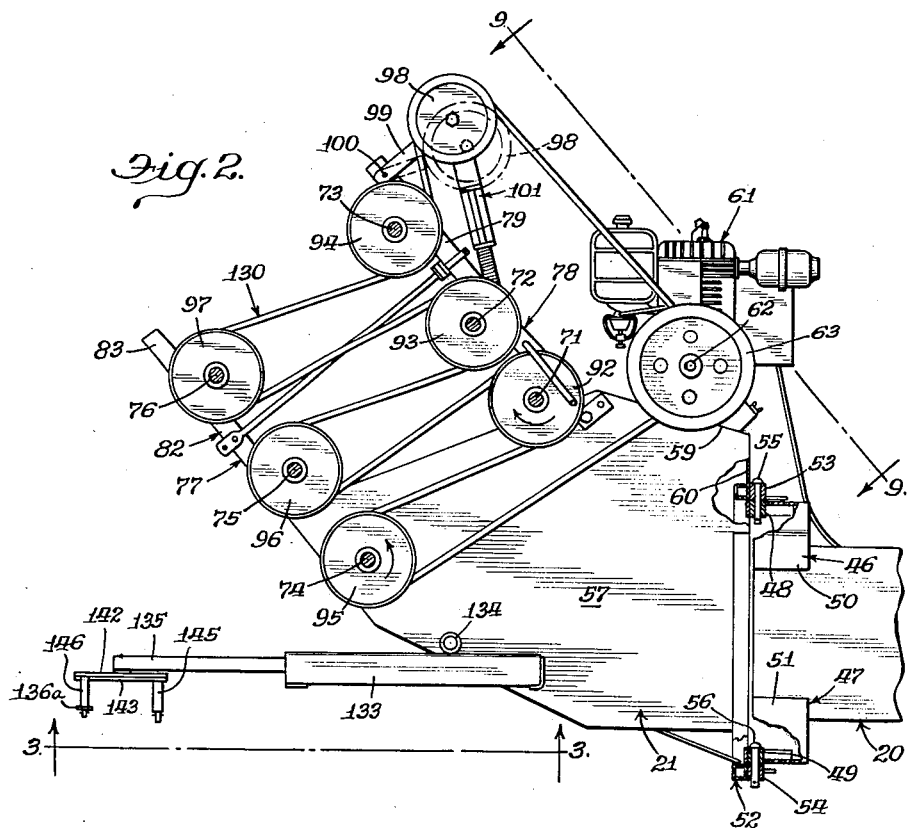
FIG. 2 is a side elevational view showing the serpentine arrangement of a belt to effect a driving of the plurality of bale engaging rollers.

Attention is now directed to FIG. 2 wherein the bale forming chamber 20 is provided with bracket members 46 and 47. The bracket 46 is arranged and constructed to carry a vertically disposed sleeve or socket member 48, whereas the bracket 47 carries a similar sleeve or socket member 49. The brackets 46 and 47 are substantially U-shaped. The bracket 46 forms an inverted U with the side legs 50 fastened to the side of the bale forming chamber 20. Similarly, the bracket 47 forms an upright U and has its side legs 51 attached to the side walls of the forming chamber 20. The sockets 48 and 49 are positioned substantially at the centers of the U-shaped brackets 46 and 47 and are in vertical axial alignment with one another. The bale thrower 21 is equipped with a rectangularly shaped reinforcing structural member 52 at its forward end for substantially adjacent positioning to the discharge end of the bale forming chamber 20. Fastened to the reinforcing rectangularly shaped ring 52 is a first sleeve or socket member 53 at the top thereof, and at the bottom a sleeve or socket 54 is provided. These sockets 53 and 54 are similarly in vertical axial alignment and the socket 53 is adapted to be mounted directly over the socket 48 supported by the bale forming chamber 20 whereas the socket 54 is arranged to lie immediately beneath the socket 49 on the bale forming chamber 20. Removable pins 55 and 56 pass respectively through the aligned sockets 53 and 48 and 49 and 54 whereby the bale thrower 21 has pivotal capabilities about the vertically aligned pins 55 and 56 as a vertical hinge. The reinforcing ring 52 on the bale thrower 21 is sufficiently large to permit swinging around the relatively smaller bale forming chamber 20. This, of course, avoids any binding of the bale thrower relative to the bale forming chamber when the thrower is directed at an angle with respect to a generally fore-and-aft line through the bale forming chamber 20.

Generally the bale thrower 21 includes spaced side sheets 57 and 58 which are joined by a cross top sheet 59 and a downwardly depending forward wall 60 as shown in FIGS. 1, 2, and 7. The top 59 forms a shelf or support for an engine 61. The engine does not specifically form a part of the present invention other than to provide rotational drive for the plurality of bale projecting rollers to be subsequently described in detail. The engine 61 has a driven shaft 62 projecting out one end thereof and this shaft carries a flywheel 63 and a belt pulley 64. A plurality of spaced apart rollers 65, 66 and 67 are provided in generally aligned position forming an upward and rearward continuation of the top of the bale forming chamber 20. Similarly, a plurality of generally aligned rollers 68, 69 and 70, spaced beneath the first set of rollers and forming an upward and rearward continuation of the lower or bottom of the bale forming chamber 20, constitute the means for ejecting the bales 43 upwardly and rearwardly in the direction of the arrow 45, as best shown in FIG. 7. The rollers 65 through 70 are respectively mounted on shafts 71, 72, 73, 74, 75 and 76. The bale thrower of this invention includes a frame supporting structure generally designated by the numeral 77. This supporting structure is flanked at its forward end by the side sheets 57 and 58 and at the rearward and upward portions thereof the frame structure includes an upper portion 78 which comprises spaced apart angle members 79 and 80 which are joined at their upper and rearward ends by a cross angle member 81. Similarly, the lower portion of the thrower which is inclined upwardly and rearwardly includes a portion 82 of the frame structure 77 and this includes spaced apart angle members 83 and 84 which are joined at their outer ends by a cross angle member 85. It is on these sub-frame sections 78 and 82 that the rollers 65 through 70 are journally mounted as shown in FIGS. 4 and 6. The shafts 71, 72 and 73 for the upper set of rollers 65, 66 and 67 are carried in hanger bearings 86, 87 and 88 mounted on the undersides of both of the spaced apart members 79 and 80 of the upper subframe 78. Similarly, the lower set of rollers 68, 69 and 70 have their shafts 74, 75 and 76 carried in spaced apart pillow block bearings 89, 90 and 91 mounted on each of the side angle members 83 and 84 of the lower sub-frame 82.

As best shown in FIG. 2, each of the roller shafts 71 through 76 respectively carries a V-pulley 92, 93, 94, 95, 96 and 97. An idler pulley 98 is journally mounted for rotation on an arm 99 which is shown pivotally attached at 100 to the upper sub-assembly frame 78 at generally the rearward portion of the angle member 79. The V-pulley idler 98 is shown extended in the full line position of FIG. 2 and is shown retracted in dashed lines in FIG. 2. This is accomplished by reason of an arm 101 joining the pulley at its journal mounting to the hinged arm 99 and extending forwardly and downwardly for a hinged connection to a crank 102 which is fastened to a hand-engaging crank lever 103 so that when the lever 103 as shown in FIG. 10 is in one position. Attention is directed to FIG. 11 wherein the diagonal connecting link arm 101 is retracted whereas in FIG. 12 the diagonal arm 101 is extended causing the V-pulley 98 to be in its extended belt tightening position. The diagonal arm 101 includes a rod-like member 104 which has an angularly bent end portion 105 for passing through an outer end portion of the crank element 102. A cotter pin 105a holds the rod end 105 against unwarranted removal from the element 102. A second element includes a metal strip 106 which extends rearwardly and is carried on a bolt 107 on which the idler V-pulley 98 is mounted. A section of this strip 106 is substantially U-shaped, as shown at 108, and aligned openings in the side portions of the U-shaped member 108 receives the rod 104. The longitudinally spaced apart sides or flanges of the U-shaped portion 108 of the strip member 106 are shown at 109 and 110. A washer 109a surrounds the rod 104 and abuts the outer surface of the flange 109. A cotter pin 109b passes through the rod 104 and holds the assembly from undesired separation. A spring 111 surrounds the rod 104 in back of the end flange 110 of the strip member 106. The other end of the spring 111 is backed by a flat washer 112 affixed by means of a cotter pin 112a to the rod 104 at a position closely adjacent the end portion 102 of the rod 104. The spring 111 thus normally urges the strip member 106 outwardly from the flat washer 112. The crank element 102, which is a short strip member, is adapted to abut or strike the lower flange 79a of the angle member 79 thereby limiting the movement of the crank element 102 to approximately 180°. The hinge for the crank 102 and its operating lever 103 is about the axis 113 of the crank arm 103. This portion of the arm 113 is journaled for rotational movement within and between the upwardly extending flange 79b of the angle member 79 and the plate member 114 shown welded or otherwise fastened to this same angle member 79 at a position spaced inwardly of the vertical flange 79b. The operation of the belt tightener is best shown in the detail views of FIGS. 11 and 12 wherein, as shown in FIG. 11, the sheave 98 has been swung away from a belt tightening position to the position as shown in dash lines in FIG. 2. In this environment the spring 111 is relaxed and there is no spring pressure urging the pulley 98 toward a belt tightening position such as shown in the full line position of the pulley 98 in FIG. 2. FIG. 11 further shows the crank 102 lying down parallel to the flange 79a of the angle member 79 on one side of the hinge 113. FIG. 12 shows the belt tightened position wherein the crank arm 102 has been swung to the opposite side of the hinge 113 causing a shortening of the distance between the fixed collar 112 and the flange 110 of the bracket member 106. This has caused a compression of the spring 111 to thereby urge the bracket member 106 toward a belt tightening position. Actually the pulley 98 has been moved in a rightward direction from that position shown in FIG. 11 by reason of the swinging of the arm 99 about its hinge 100. A line 115 has been drawn between the centers of the hinge shafts 107 and 113 in FIG. 12 to indicate that in that position of the crank arm 102 there is constituted an overcenter locking means to thus hold the sheave 98 in its belt tightening position and resisting any movements from the end of the sheave to shift back into the position of the belt loosened state as in FIG. 11. The only way the pulley 98 may be moved from its belt tightening position is by manually swinging the crank 103 to thereby swing the crank member 102 upwardly so that it passes through the line 115 whereafter the arm will swing easily and move to the position as shown in FIG. 11.

The roller construction for the rolls 92 to 97 inclusive, for engaging and propelling the bales to a trailing wagon or the like, is important to the success of this device. Attention is directed to FIGS. 4 and 5 wherein the roll 94 has been shown in detail. FIG. 5 shows the shaft 73 on which is mounted a core in the form of a sleeve-like member 116. The sleeve is welded at 117 to an end plate or disk 118. The disk 118 in turn is weldably attached as shown at 119 to the shaft 73. The other end of the sleeve 116 is provided with an end disk 120 which is weldably attached at 121 around the inner annular periphery of the core sleeve 116 and is in turn welded at 122 to the shaft 73. The end plate 118 is equipped with an outwardly extending annular flange 123 which, as shown in FIG. 4, provides an end abutment for the friction surfaced bale engaging elements mounted on this core sleeve 116. A hole 124 passes through the shaft 73 and provides for the locking of an end plate 125, as shown in FIG. 4, by means of a pin or the like 126. In the construction of the rollers a plurality of small semi-pneumatic tires 127 are mounted over the sleeve-like core 116 and compressed thereon by means of the end washer or holding plate 125 which in turn is locked by the key 126.

The semi-pneumatic tire members 127 shown in FIG. 4 are each provided with an annular chamber 128 for the entrapment of air in limited amounts to thereby cushion the impact of any object coming in contact with the series of tires 127. Simultaneously the entrapped air chambers prevent the complete collapse of the tire elements and insure continued driving engagement with the bales to be thrown. The tread formations 129 on the tires positively engage and frictionally grip the opposite sides of a newly-formed bale to impel that bale upwardly and rearwardly in the direction of the arrow 45 as shown in diagrammatic form in FIG. 7. A double edged V-belt 130 is arranged within the plurality of sheaves, as shown in FIG. 2, to effect a driving of the semi-pneumatic tire rollers 65 through 70, inclusive, in such a manner that the lower series of rollers 68, 69 and 70 rotate in the direction of the arrow 131 as shown in FIG. 7, and the upper series of rollers 65, 66 and 67 rotate in the direction of the arrow 132. Thus, the inner surfaces of the rollers cooperate to effect an upward and rearward movement in the direction of the arrow 45 of the formed bale.

As stated in the objects above, mechanism is provided for effecting a turning of the bale throwing device upon the pulling hay baler having relative angular position with respect to a bale receiving trailing wagon. This mechanism is shown in detail in FIGS. 3 and 8. FIG. 3 shows a generally channel shaped housing 133 which is hingedly mounted on an arm 134 affixed to the side and extending across and under the bale throwing mechanism. A forwardly extending arm member 135 is provided with a wagon tongue engaging member 136. It should be understood that this device 136 and the channel shaped housing 133 may be swung vertically about the shaft 134 as an axis so that when the channel member 133 and its projecting arm 135 is moved downwardly about the shaft 134, the tongue engaging mechanism 136 can flank the tongue in a manner to be subsequently described. The arm member 135 is equipped with a pivot pin 137 at its inner end and the pivot pin is equipped with a bracket member 138 to which is attached the forward end 139 of a coil spring 140. The rearward end of the spring 140 is adjustably anchored as at 141 to the other end of the channel member 133. The channel 133 is provided with hook-like members 133a and 133b on opposite interior walls thereof adjacent the outer ends of the pivot pin 137.

Small vertically disposed rod members 137a and 137b are weldably attached to the outer ends of the pivot pin 137. These end rods loosely engage the hook-like members 133a and 133b respectively. Movement of the pivot pin 137 within the channel member 133 is resisted by the spring 140. However, in instances of emergency the arm 135 can yield to the position as shown in dash lines in FIG. 3 where the end rod 137a acts as a hinge pin within the hook-like member 133a. Conversely the device may swing the other way with the end rod 137b acting as the hinge pin within the hook-like member 133b. Attention is now directed to FIG. 8 of the drawing which shows the forward end of the wagon box 23 and a forwardly projecting wagon tongue 30. The wagon 23 is positioned directly rearwardly of the bale discharging device in its full line position thereof, whereas, when the wagon has had relative movement, either right or left, the bale-throwing mechanism is moved to the dash-line position thereof, as shown in FIG. 8, following part way the movement of the trailing wagon. It should be noted that in the dashed-line position of the discharge mechanism and the trailing wagon on the left side of FIG. 8, the bales moving therethrough will be deposited in the trailing wagon while in the dashed-line position of the discharge mechanism on the right side of FIG. 8 there is shown an exaggerated relative movement of the wagon with respect to the pulling hay baler which is beyond the scope of the possible movement of the bale discharge mechanism. Thus, there is a limit means to the swingability of the bale throwing mechanism. This limit is accommodated by separation of the pivot pin 137 with respect to the tubular housing 133 as shown in either of the dashed-line positions of FIG. 3 or FIG. 8. It is impractical to have the bale throwing mechanism swing around greater than this angle of approximately 30° and hence the automatic release mechanism for separating the bale throwing mechanism from the wagon tongue such as shown in the dashed-line position of the wagon in the right side of FIG. 8 is desirable. The channel 133 is formed as a part of the bale throwing mechanism inasmuch as the shaft 134 is fixed to the bale throwing mechanism. However, the channel 133 does have rocking movement relative to the bale throwing mechanism so that the tongue engaging mechanism 136 can drop over the wagon tongue 30. The tongue engaging mechanism 136 includes crossed members 142 and 143 with a hinge pin 144 at the center thereof. At the outer extremity of each of the cross arms 142 and 143 are downwardly extending, roller-like sleeve covered pins 145, 146, 147 and 148. These pins, as shown in FIG. 1, are adapted to drop over and flank the sides of the wagon tongue 30. A bar member 136a having a plurality of adjustment holes 136b therein is used to adjust the width of spread of the member 136 to easily and freely engage any width of wagon tongue. Locking pins 146a and 148a are removably engaged with the lower ends of the pins 146 and 148 respectively to thus hold the bar 136a in fixed position on the cross member structure 136 in any set of desired holes 136b. The bar 136a also acts to lock the tongue engaging means to the wagon tongue during operation of the device of this invention. The width adjustment is made so that the pins 145, 146, 147, and 148 snugly flank the side of the tongue 30 to effect an immediate response to a swinging movement of the tongue through the arm 135 and tubular housing 133 whereby there is a similar and corresponding swinging movement of the entire bale throwing device. Thus there is a concurrent movement of the bale throwing mechanism with the turning of the wagon tongue 30 until the built-in limit is reached and the pivot pin 137 swings in a hinging fashion out from the channel 133 thereby causing a collapse of the arm 135 relative to the housing 133 and the result is the device as shown in dashed lines on the right half of FIG. 8.

In the operation of the device of this invention, the hay baler is drawn through a field of windrowed hay by a tractor, or the like, and a wagon 23 is attached to the back of the bale forming chamber by means of a pin 31 and clevis 32. The bale throwing mechanism by reason of the serpentine V-belt 130 driven by the engine 61 causes the semi-pneumatic laminated rolls to engage bales being pushed therebetween and the bales are elevated at a relatively high rate of speed upwardly and rearwardly in the direction of the arrow 45 and as shown in FIG. 1 so that the bales are deposited in the large wagon box 24 of the trailing wagon 23. Variations in engine speed are utilized to vary the length of bale throw to fill the wagon box from front to rear. A throttle control 61a extends forwardly from the engine 61 to a position adjacent the operator's station on a pulling tractor. During angular movements of the hay baler relative to the trailing wagon, there are means provided for pulling the bale throwing mechanism about its hinge 56 until the limit of swingability is reached and thereafter the mechanism separates as shown in dashed lines in FIG. 3 and in FIG. 8. This, of course, causes a saving of most of the hay bales thrown inasmuch as the wagon box is usually directly behind the bale thrower until the angular relationship gets too great to be accommodated by this feature.

When operation is completed, the tension on the V-belt 130 is relaxed by means of the crank member 103 being turned to the loosened position of the belt. This, of course, may be reengaged very rapidly merely by swinging the crank to the opposite position, and thus shifting the sheave 98 and tightening the belt.

FIG. 13 shows a modified form of feed roll construction comparable to the roll as shown in FIG. 4. A shaft 150 is carried on spaced apart angle support members 151 and 152 by means of hanger-type bearings 153 and 154, respectively. A belt pulley 155 is mounted at the outer end of the shaft 150 and is adapted to impart rotation thereto. The roller proper includes a core 156 mounted over and attached to the shaft 150. The core is equipped with an annular flange 157 on one end thereof which acts as a stop for the plurality of semi-pneumatic tires 158 which are pressed over the core 156. The roll shown in FIG. 13 distinguishes from the roll of FIG. 4 in that it has spaced apart annular portions without semi-pneumatic tires. As previously explained, the rollers of this invention are arranged and constructed to impart movement to a bale of hay which is fed between spaced apart friction rollers such as that shown in FIG. 4 and/or the roller of this FIG. 13. The lug or tread formation on the outer surfaces of the semi-pneumatic tires causes a firm gripping of the outer surfaces of the bale of hay to thereupon impart the fast movement of the rolls to the intermediately disposed bale of hay for accomplishing a pitching or throwing of that bale from the baler to a trailing wagon. The baler produces a compact quantity of hay which is provided with bale encircling strands of twine or wire to hold the compacted hay in its desired shape as imparted to the hay in the bale forming chamber. The purpose of the annular spaces in the roller of FIG. 13 is to prevent engagement of the friction rollers with that portion of the bale having the bale encircling twines. Inasmuch as the rollers are constantly rotating at relatively high rates of speed, it is not desirable for the lugged semi-pneumatic tires to engage the twine. Rather it is desirable for the roller to engage the broad surfaces of the hay bale and grip the bale over substantial surfaces for effecting movement of the bale without a tearing of the hay or the twine. It should be understood that bales of hay are tied with various numbers of encircling twines. Thus the annular spaces on the rollers to avoid engagement of the twines would depend on the number of twines used in encircling the bales. In the present disclosure the bales have two bale encircling twines such as shown at 22a and 22b in FIG. 1.

Continuing now with the description of the roll construction, it should be noted that there is included a washer 159 abutting a portion of the tires 158, an elongated sleeve spacer 160 lying axially of the core 156 and abutting the washer 159 and thus holding those semi-pneumatic tires 158 on the core 156 in the position in which they are initially placed. A second washer 161 abuts the other end of the sleeve spacer 160 whereafter there is positioned another group of semi-pneumatic tires 158. This group of tires is flanked by a washer 162, a sleeve spacer 163 and another washer 164 to define a second annular space on the roller to accommodate a second bale encircling twine. Thereafter the roll includes another group of semi-pneumatic tires 158 and the roll is completed with an end cap 165 held in position with a locking pin 166. Of course, the operation of the roller of FIG. 13 is identical to the operation of the roller of FIG. 4 but for the inability of the roller of FIG. 13 to grip and possibly burn through the bale encircling twines such as shown at 22a and 22b in FIG. 1.

A further modification of roll construction is shown in FIG. 14. There is only a partial showing of this roll to indicate the feature disclosed therein. The device includes a shaft 167 which, of course, is similar to the shaft 73 of FIG. 4 and the shaft 150 of FIG. 13. An angle support 168 is utilized for the purpose of carrying the shaft 167 through the medium of a hanger-type bearing 169. The roller includes a core 170 mounted on the shaft 167 and a plurality of semi-pneumatic tires 171 mounted thereon. Each of the semi-pneumatic tires 171 includes an annular groove 172 on one side wall thereof having an inner wall generally designated 201 and an outer wall generally designated 202 and on the other side wall an annular rib 173 that has an upper surface generally designated 203 and a lower surface generally designated 204. Thus when the semi-pneumatic tires are placed in abutting side-by-side relationship, the annular groove of each tire receives in interlocking relation the annular rib of each adjacent tire. For that portion of the roll shown in FIG. 14 there is provided an end cap 174 and a locking pin 175. Other than the interlocking of the tires in this FIG. 14, the construction of the roll could be either that of FIG. 4 or FIG. 13 as previously described.

The purpose of the interlocking annular ribs with the annular grooves in adjacent tires which compose the friction bale feeding roll of this invention is to prevent any of the tires from becoming eccentrically positioned relative to the shaft 167 and its concentric core 170. With the high speeds of rotation of the roller of this invention necessary to cause proper bale throwing there is a tendency for the semi-pneumatic tires to "grow." Oftentimes this growth of the tires is irregular and the roll tends to become unbalanced. With the interlocking of the tires as provided in FIG. 14, this growth is always uniform throughout the full width of the roller making for uniform balanced operation.

We are aware that many details of construction may be varied throughout a wide range without departing from the principles disclosed herein, and we, therefore, do not propose limiting the patent granted hereon otherwise than as necessitated by the appendant claim.

What is claimed is:

A friction feed roller for use in agricultural machines comprising a core and a plurality of individual semi-pneumatic tires mounted in side-by-side relation on said core;

an annular flange secured to one end of said core to function as a stop for said tires, an annular end cap adapted to fit over the other end of said core and cooperating with said annular flange to hold said tires in side-by-side relationship, and locking means for releasably locking said end cap in position on said core;

each of said tires having an annular groove formed in one of its sides, said grooves having inner walls and outer walls;

each of said tires having an annular rib formed in its other side, said ribs having an upper surface and a lower surface;

said annular grooves and ribs being located and dimensioned such that the annular rib of one tire fits into the annular groove of an adjacent tire and the upper and lower surfaces of the ribs bear against the inner and outer walls of the grooves such that adjacent tires are interconnected and the radial expansion of one tire is restricted through its interconnection with the adjacent tires.

References Cited in the file of this patent

UNITED STATES PATENTS

| | | |
|---|---|---|
| 2,007,910 | Stephens | July 9, 1935 |
| 2,135,175 | Fallon | Nov. 1, 1938 |
| 2,169,623 | Weiss | Aug. 15, 1939 |
| 2,183,401 | Judelsohn | Dec. 12, 1939 |
| 2,266,506 | Morse | Dec. 16, 1941 |
| 2,464,907 | Unruh | Mar. 22, 1949 |
| 2,493,479 | Eggleston | Jan. 3, 1950 |
| 2,701,049 | Kendall | Feb. 1, 1955 |
| 2,767,866 | Heinje | Oct. 23, 1956 |
| 2,772,793 | Brusewitz | Dec. 4, 1956 |
| 2,809,865 | Earnshaw | Oct. 15, 1957 |
| 2,812,052 | Doyer | Nov. 5, 1957 |
| 2,827,155 | Callum | Mar. 18, 1958 |
| 2,860,766 | Welter | Nov. 18, 1958 |

FOREIGN PATENTS

| | | |
|---|---|---|
| 749,646 | Great Britain | May 30, 1956 |
| 762,571 | Great Britain | Nov. 28, 1956 |